United States Patent
Fukuda

(10) Patent No.: US 10,073,889 B2
(45) Date of Patent: Sep. 11, 2018

(54) INFORMATION PROCESSING APPARATUS AND INFORMATION PROCESSING METHOD

(71) Applicant: SONY CORPORATION, Tokyo (JP)

(72) Inventor: Kazuhiro Fukuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 252 days.

(21) Appl. No.: 14/787,657

(22) PCT Filed: Apr. 10, 2014

(86) PCT No.: PCT/JP2014/002068
§ 371 (c)(1),
(2) Date: Oct. 28, 2015

(87) PCT Pub. No.: WO2014/185004
PCT Pub. Date: Nov. 20, 2014

(65) Prior Publication Data
US 2016/0085814 A1    Mar. 24, 2016

(30) Foreign Application Priority Data
May 15, 2013   (JP) ................................ 2013-103018

(51) Int. Cl.
*G06F 17/00*   (2006.01)
*G06F 17/30*   (2006.01)

(52) U.S. Cl.
CPC .. *G06F 17/30528* (2013.01); *G06F 17/30398* (2013.01); *G06F 17/30542* (2013.01);
(Continued)

(58) Field of Classification Search
CPC ......... G06F 17/30651; G06F 17/30398; G06F 17/30528; G06F 17/30598; G06F 17/30722; G06F 17/30637
See application file for complete search history.

(56) References Cited

U.S. PATENT DOCUMENTS

| 8,341,167 B1 * | 12/2012 | Podgorny ......... G06F 17/30976 |
| | | 707/758 |
| 2005/0192953 A1 * | 9/2005 | Neale ................ G06F 17/30637 |

(Continued)

FOREIGN PATENT DOCUMENTS

| JP | 2010-032509 A | 2/2010 |
| JP | 2010-157156 A | 7/2010 |
| JP | 2011-107908 A | 6/2011 |

OTHER PUBLICATIONS

Office Action for JP Patent Application No. 2015-516892, dated Mar. 20, 2018, 3 pages of Office Action and 3 pages of English Translation.

*Primary Examiner* — Cheryl Lewis
(74) *Attorney, Agent, or Firm* — Chip Law Group

(57) ABSTRACT

Provided is an information processing apparatus including a control section that provides, to a terminal of a user, a relationship among a plurality of keywords each as an element constituting a facet that is used as an index for searching for a content, as a facet map, and a facet selection environment that is based on at least one keyword addable to the facet map as a new element of the facet, calculates a usage frequency of each of the keywords in the terminal, and adds a keyword whose calculated usage frequency satisfies a predetermined condition to the facet map as the new element of the facet.

7 Claims, 15 Drawing Sheets

(52) U.S. Cl.
CPC .. *G06F 17/30598* (2013.01); *G06F 17/30637* (2013.01); *G06F 17/30651* (2013.01); *G06F 17/30722* (2013.01)

(56) References Cited

U.S. PATENT DOCUMENTS

2008/0133585 A1* 6/2008 Vogel ............... G06F 17/30734
2008/0243778 A1* 10/2008 Behnen ............ G06F 17/30554
2012/0197849 A1* 8/2012 Srinivasa ......... G06F 17/30522
707/687

* cited by examiner

INFORMATION PROCESSING APPARATUS AND INFORMATION PROCESSING METHOD

TECHNICAL FIELD

The present technique relates to an information processing apparatus, an information processing method, and a program that are used in structuring a facet navigation system.

BACKGROUND ART

In recent years, a facet search is used as an information search mechanism. The facet search is a mechanism that navigates a user on a facet (aspect of things) as a condition for an information search and sends back an information search result to an arbitrary facet selected by the user.

The facet-type metadata is basically constituted of relationships among categories and facet values. Specifically, by structuring the facet values to have a hierarchical relationship with lower-order facet values, the facet-type data can be hierarchized.

For example, when there are "place" and "time" as categories of a top hierarchy, "Western Europe", "Asia", "North America", or the like that largely categorizes the place is defined as a facet value corresponding to the category "place". This facet value belongs to a category of a subsequent lower-order hierarchy, and "Japan", "Korea", "Taiwan", or the like is defined as a facet value corresponding to the category "Asia", for example. Also in the case of the category "time", the relationships among the categories and facet values are defined hierarchically. Prior to the search, the user can select one or more conditions narrowed down based on the hierarchical relationships among the categories and facet values and the hierarchical relationships among the facet values in the facet-type data.

Patent Document 1 discloses a server apparatus that includes a storage section for storing facet-type data in which priorities are set to facet items (categories) to narrow down content-related information (advertisement information and product information) using the facet-type data and sends back a content selected by a user and related information of the selected content, that is based on the facet items and facet values, to the user.

Patent Document 1: Japanese Patent Application Laid-open No. 2011-107908

SUMMARY OF INVENTION

Problem to be Solved by the Invention

In recent years, various refinements related to the facet search mechanism have been made. However, there are still a number of problems to be solved for practical use.

In view of the circumstances as described above, the present technique aims at providing an information processing apparatus, an information processing method, and a program that are capable of realizing an improvement in performance of a facet search.

Means for Solving the Problem

To attain the object described above, according to the present technique, there is provided an information processing apparatus including a control section that provides, to a terminal of a user, a relationship among a plurality of keywords each as an element constituting a facet that is used as an index for searching for a content, as a facet map, and a facet selection environment that is based on at least one keyword addable to the facet map as a new element of the facet, calculates a usage frequency of each of the keywords in the terminal, and adds a keyword whose calculated usage frequency satisfies a predetermined condition to the facet map as the new element of the facet.

The control section may provide, to a terminal of a creator creating content metadata, information on a metadata creation screen into which the creator can input, as a new element of the metadata, at least one keyword addable as the new element of the facet, store the at least one keyword input as the new element of the facet on the metadata creation screen, and provide, to the terminal of the user, the facet selection environment that is based on the facet map and the at least one stored keyword.

The facet may be constituted of at least a facet category and a facet value belonging to the facet category, and different conditions may be set for a keyword set as the facet category and a keyword set as the facet value.

The facet map may exist for each predetermined usage style for categorizing the user. In this case, the control section may provide the facet selection environment that is based on a facet map corresponding to the usage style of the user who has requested the facet selection environment and the at least one keyword addable as the new element of the facet.

Further, the control section may add, as the new element, a keyword whose calculated usage frequency satisfies a predetermined condition to the facet map corresponding to the usage style of the user who has requested the facet selection environment.

According to the present technique, there is provided an information processing method including: providing, by a control section, to a terminal of a user, a relationship among a plurality of keywords each as an element constituting a facet that is used as an index for searching for a content, as a facet map, and a facet selection environment that is based on at least one keyword addable to the facet map as a new element of the facet; and calculating, by the control section, a usage frequency of each of the keywords in the terminal, and adding a keyword whose calculated usage frequency satisfies a predetermined condition to the facet map as the new element of the facet.

According to the present technique, there is provided a program that causes a computer to function as a control section that provides, to a terminal of a user, a relationship among a plurality of keywords each as an element constituting a facet that is used as an index for searching for a content, as a facet map, and a facet selection environment that is based on at least one keyword addable to the facet map as a new element of the facet, calculates a usage frequency of each of the keywords in the terminal, and adds a keyword whose calculated usage frequency satisfies a predetermined condition to the facet map as the new element of the facet.

Effect of the Invention

As described above, according to the present technique, the performance of facet search can be improved.

MODES FOR CARRYING OUT THE INVENTION

Hereinafter, an embodiment of the present technique will be described with reference to drawings.

1. First Embodiment

1. Definition of Terms

First, definitions of terms used in this embodiment will be described.

Facet

A facet refers to an aspect or angle of things. The facet is constituted of elements such as a facet category and a facet value and used as an index of content metadata.

Facet Navigation

A facet navigation is a system for narrowing down contents based on a selection of a prepared facet by a content searcher.

Facet Category

A facet category is a category focusing on an important feature or attribute of a content. The facet category differs depending on a content or a usage style to be described later.

Facet Value

A facet value is a value of the facet category.

One or more facet values can be defined with respect to one facet category. The facet values may be hierarchized into one or more orders.

Usage Style

A usage style is used for categorizing and managing users using the facet navigation system. In this embodiment, three usage styles, that is, a user in a broadcast station that has created a content (own broadcast station), a user in a different broadcast station, and a general user, are defined, though the present technique is not limited thereto.

Facet Map

A facet map is information indicating relationships among the facet categories and facet values for each usage style. Since content features and attributes that are focused by a plurality of users of different usage styles differ even when targeting the same content, the facet map is created for each usage style.

Content Metadata

Content metadata is data used for searching for a content and is constituted of various types of data related to a content, such as a feature and attribute of a content. In this embodiment, the metadata is constituted of a facet category and facet value so as to support a facet search.

2. System Structure

Figure 1:
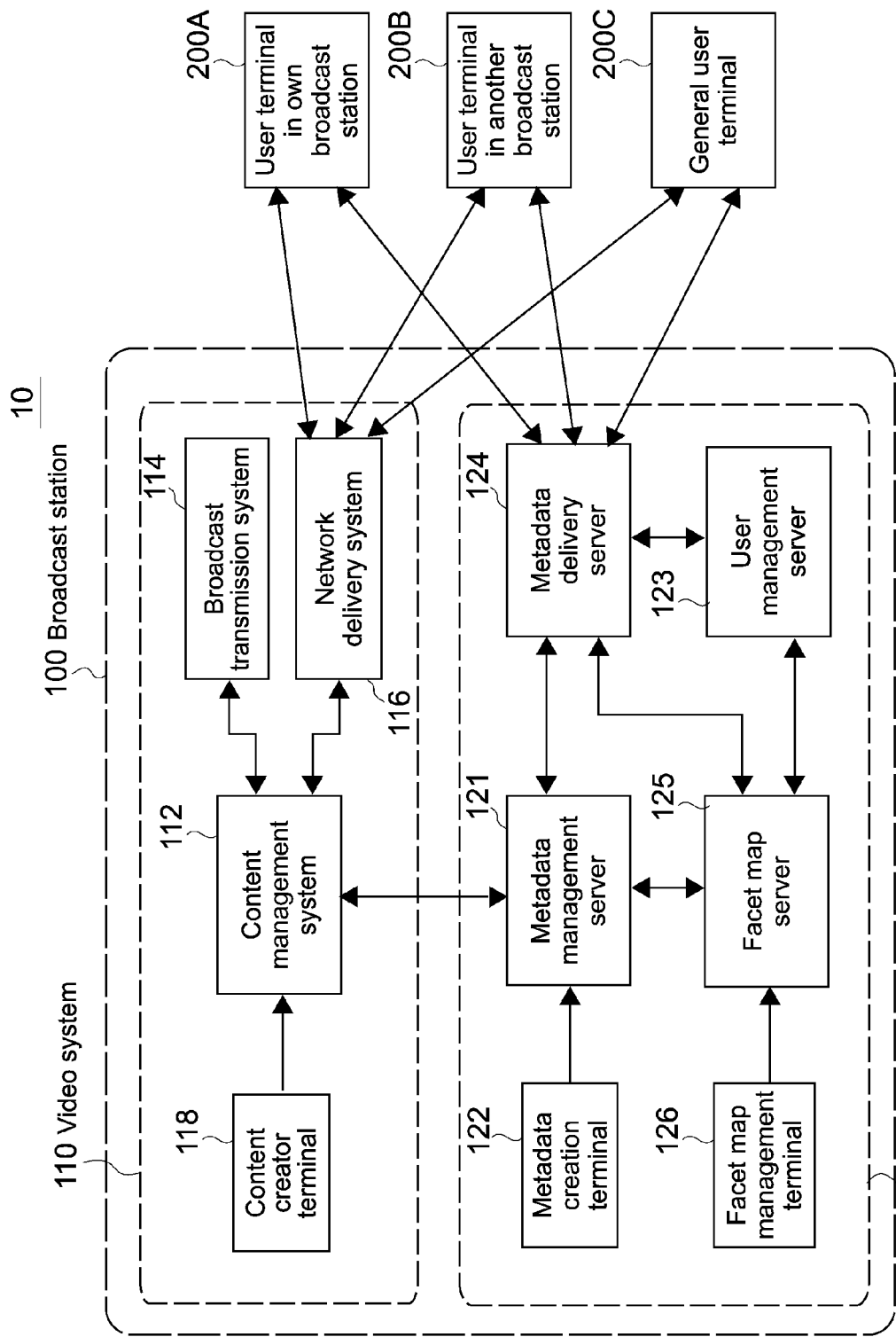
FIG. 1 A diagram showing an overall structure of a facet navigation system according to a first embodiment of the present technique.

FIG. 1 is a diagram showing an overall structure of a facet navigation system 10 according to a first embodiment of the present technique.

The facet navigation system 10 mainly includes a broadcast station 100 and a plurality of user terminals 200A, 200B, and 200C.

(2-1. Structure of Broadcast Station)

The broadcast station 100 includes a video system 110 and a metadata system 120.

The video system 110 performs generation, management, broadcasting, network delivery, and the like of moving images, moving images with audio, still images, and the like. Information managed by the video system 110, such as the moving images, moving images with audio, and still images are collectively referred to as "contents".

The metadata system 120 performs generation, management, network delivery, and the like of metadata of contents managed by the video system 110.

(2-2. Structure of Video System 110)

The video system 110 includes a content management system 112, a broadcast transmission system 114, a network delivery system 116, and a content creator terminal 118.

The content management system 112 is a system that manages body data of a content, thumbnail still image data and preview video data of the content (video data having lower resolution than content body data), and the like in association with one another. In the content management system 112, the content body data, the thumbnail still image data, and the preview video data are allocated with content IDs for identifying those data as one content data set.

It should be noted that in the descriptions below, when simply referred to as "content", it refers to at least one of the content body data, the still image data, and the preview data.

The content management system 112 includes a storage that stores data such as actual data of a content, thumbnail still image data, and preview moving image data, and a controller that performs a search of data stored in the storage and operation and management. Specifically, the storage is a hard disk drive, an optical disc drive, a recording/reproducing apparatus that uses a semiconductor, and the like. Specifically, the controller is constituted of one or more computers such as a server and a personal computer that include a CPU (Central Processing Unit), a main memory, an input apparatus that uses, for example, a keyboard, a mouse, and a touch sensor panel, an output apparatus such as a display, a network communication apparatus, and an interface for the storage.

The content management system 112, the broadcast transmission system 114, the network delivery system 116, and the content creator terminal 118 can be connected so as to be communicable with one another through a network such as a LAN (Local Area Network).

The broadcast transmission system 114 is equipment that transmits contents to terminals that are capable of receiving broadcast waves, such as the user terminals 200A, 200B, and 200C.

The network delivery system 116 is a system that delivers contents to the terminals connected via the network, such as the user terminals 200A, 200B, and 200C, via a network such as the Internet. Specifically, the network delivery system 116 is constituted of one or more computers such as a server and a personal computer that include a CPU (Central Processing Unit), a main memory, an input apparatus, an output apparatus, and a network communication apparatus.

The content creator terminal 118 is a terminal operated by a content creator. The content creator terminal 118 transmits data of a content created by a creator to the content management system 112 based on an instruction from the creator and stores it in the storage.

Specifically, the content creator terminal 118 is basically constituted of a computer including a CPU, a main memory, an input apparatus that uses, for example, a keyboard, a mouse, and a touch sensor panel, an output apparatus such as a display, a network communication apparatus, and a storage. For example, the content creator terminal 118 may be a personal computer, an image pickup apparatus including computer hardware, a dedicated apparatus, or the like.

(2-3. Structure of Metadata System 120)

The metadata system 120 includes a metadata management server 121, a metadata creation terminal 122, a user management server 123, a metadata delivery server 124, a facet map server 125, and a facet map management terminal 126.

The metadata management server 121 is a server that performs a storage, search, and the like of content metadata.

The metadata creation terminal 122 is used for creating content metadata by a metadata creator. The metadata created by the metadata creation terminal 122 is transmitted to the metadata management server 121 and stored in association with information on a corresponding content. The information on a content includes information requisite for accessing a content, such as an identification number, name, and access information (URL) of a content.

The user management server 123 manages a usage style of each user searching for contents. For example, users of the user terminals 200A, 200B, and 200C register their own user IDs in the user management server 123. At this time, the users designate their own usage styles. The user management server 123 stores the user IDs transmitted from the user terminals 200A, 200B, and 200C in a user management table in association with the respective usage styles.

The metadata delivery server 124 creates and supplies a facet selection environment for the facet navigation to the user terminals 200A, 200B, and 200C. The metadata delivery server 124 also generates and transmits a content search request with respect to the metadata management server 121 upon receiving operation information of a user with respect to the facet selection environment, and sends back information transmitted as a response from the metadata management server 121 to the user terminals 200A, 200B, and 200C.

The facet map server 125 is a server that carries out processing of, for example, storing, reading, and extending a facet map for each usage style.

The metadata management server 121, the user management server 123, the metadata delivery server 124, and the facet map server 125 are each constituted of a storage that stores data, a controller (corresponds to control section) that executes a function as a corresponding server based on a program, and the like. Specifically, the storage is a hard disk drive, an optical disc drive, a recording/reproducing apparatus that uses a semiconductor, and the like. Specifically, the controller is constituted of one or more computers including a CPU (Central Processing Unit), a main memory, an input apparatus that uses, for example, a keyboard, a mouse, and a touch sensor panel, an output apparatus such as a display, a network communication apparatus, and an interface for the storage. In addition, the metadata management server 121, the user management server 123, the metadata delivery server 124, and the facet map server 125 may be constituted of a single computer.

The facet map management terminal 126 is a terminal for managing a facet map of each usage style based on an operation made by a facet map manager. The facet map management involves newly registering and deleting a facet category and a facet value, setting a facet map extension condition, and the like. The facet map extension condition will be described later.

Specifically, the metadata creation terminal 122 and the facet map management terminal 126 are basically constituted of a computer including a CPU, a main memory, an input apparatus that uses, for example, a keyboard, a mouse, and a touch sensor panel, an output apparatus such as a display, a network communication apparatus, and a storage and may be, for example, a personal computer or a dedicated apparatus including computer hardware.

Heretofore, the structure of the metadata system 120 has been described.

The user terminals 200A, 200B, and 200C each accept an input operation of the user for performing a facet search of a content using the facet selection environment. Here, the user terminal 200A is a terminal operated by a user in own broadcast station, the user terminal 200B is a terminal operated by a user in another broadcast station, and the user terminal 200C is a terminal operated by a general user. The own broadcast station refers to a broadcast station that creates and manages contents as targets of the facet search. The another broadcast station refers to broadcast stations excluding the own broadcast station. The general user is a user irrelevant to the broadcast stations.

Specifically, the user terminals 200A, 200B, and 200C are basically constituted of a computer including a CPU, a main memory, an input apparatus that uses, for example, a keyboard, a mouse, and a touch sensor panel, an output apparatus such as a display, a network communication apparatus, and a storage and may specifically be a personal computer, a smartphone, or the like.

3. System Operation

Next, operations of the facet navigation system 10 of this embodiment will be described.

The descriptions on the operations will be given in the following order.

3-1. Basic operation of facet search
3-2. Management and extension setting of facet map
3-3. Registration of content and metadata
3-4. Extension of facet map (3-1. Basic Operation of Facet Search)

The facet search involves causing a display apparatus of the user terminals 200A, 200B, and 200C, such as a display, to display a facet selection environment as an operation screen for the facet search, and prompting the user to select an arbitrary facet with respect to the facet selection environment. In this regard, first, operations up to display of the facet selection environment as the operation screen for the facet search on the display apparatus of the user terminal 200A, such as a display, will be described.

Figure 12:
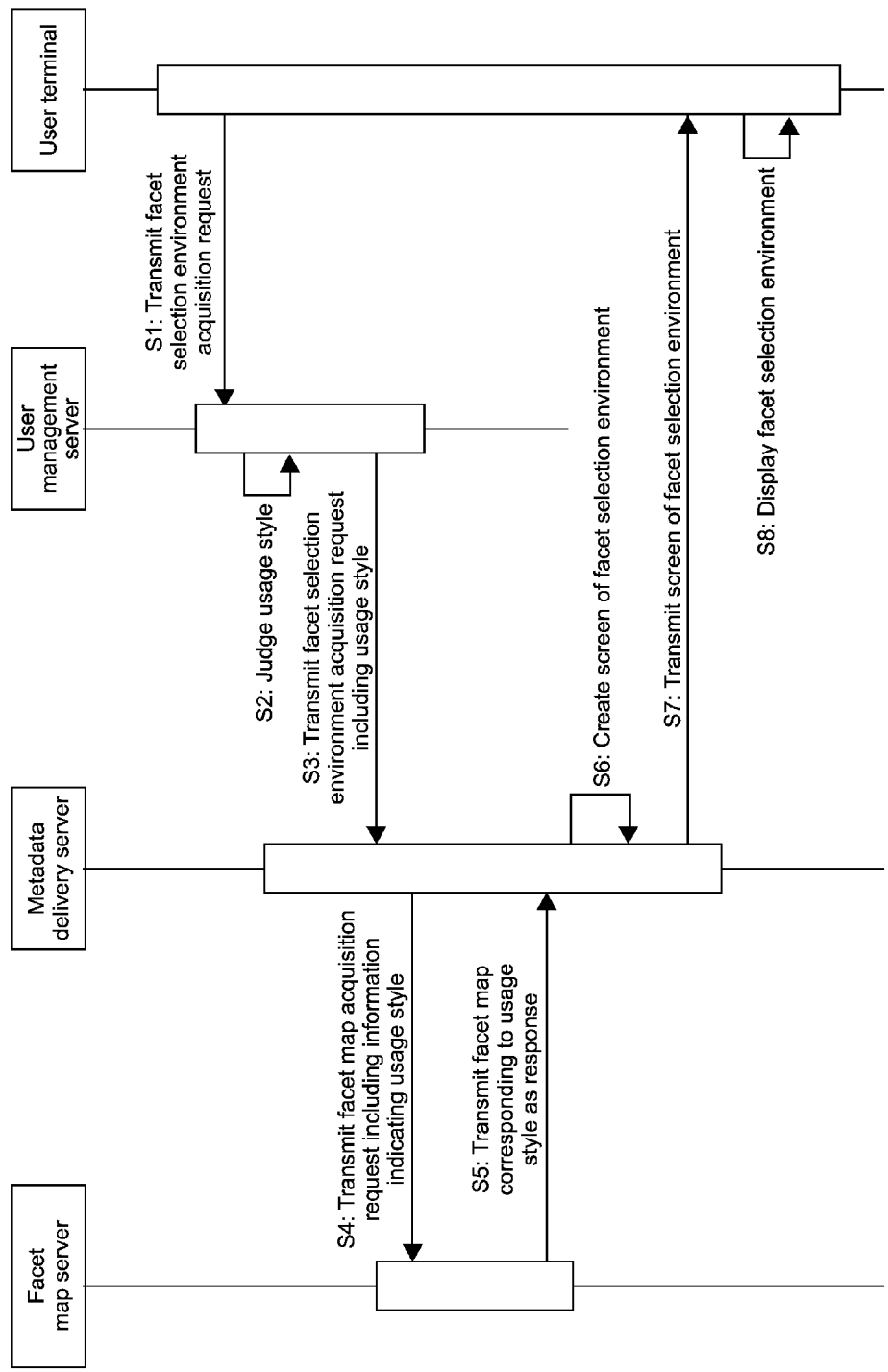
FIG. 12 A sequence diagram showing basic operations for a facet search among the user terminal, a user management server, a metadata delivery server, and a facet map server.

FIG. 12 is a sequence diagram showing basic operations for the facet search among the user terminals 200A, 200B, and 200C, the user management server 123, the metadata delivery server 124, and the facet map server 125.

First, the user operates the user terminal 200A and transmits a facet selection environment acquisition request including his/her own user ID from the user terminal 200A to the user management server 123 (S1).

Upon receiving the facet selection environment acquisition request from the user terminal 200A, the controller of the user management server 123 searches the user management table based on the user ID included in the request and judges a usage style of the user (S2). The controller of the user management server 123 adds information indicating the usage style to the facet selection environment acquisition request from the user terminal 200A and transmits them to the metadata delivery server 124 (S3).

Upon receiving the facet selection environment acquisition request from the controller of the user management server 123, the controller of the metadata delivery server 124 transmits a facet map acquisition request including information indicating the usage style included in the request to the facet map server 125 (S4).

Upon receiving the facet map acquisition request, the controller of the facet map server 125 reads out from the storage a facet map corresponding to the usage style included in the facet map acquisition request and sends it back to the metadata delivery server 124 (S5). Here, since the user of the user terminal 200A is a user in the own broadcast station, a facet map corresponding to the usage style of the user in the own broadcast station is read out.

The controller of the metadata delivery server 124 generates a facet selection environment screen for the facet navigation based on the facet map sent back from the facet map server 125 (S6) and transmits it to the user terminal 200A (S7).

The controller of the user terminal 200A displays, on a display screen of the display, the acquired facet selection environment for the facet navigation (S8).

Figure 2:
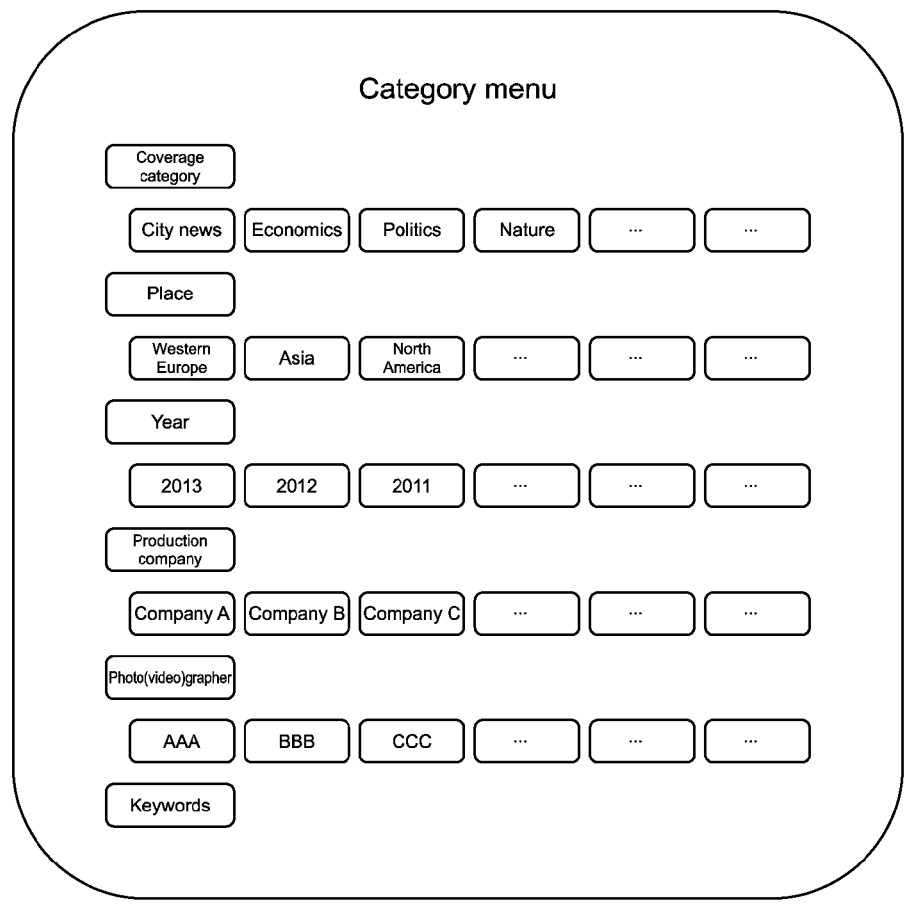
FIG. 2 A diagram showing a display example of a category menu as an initial screen of a facet selection environment.

FIG. 2 is a diagram showing a display example of a category menu 11 as an initial screen of the facet selection environment.

In this example, a case where facet categories and facet values of a first hierarchical level in a facet map are displayed in the category menu 11 will be discussed. Here, "coverage category", "place", "year", "production company", and "photo(video)grapher" are each a facet category, and facet values of a first hierarchical level are displayed with respect to each of the facet categories. For example, as the facet values of the first hierarchical level with respect to the facet category "coverage category", "city news", "economics", "politics", "nature", and the like are displayed. In the category menu 11, the user can select one or more arbitrary facet values of arbitrary facet categories to instruct a switch to the next main screen. It is also possible to instruct only the switch to the main screen without selecting anything.

Figure 3:
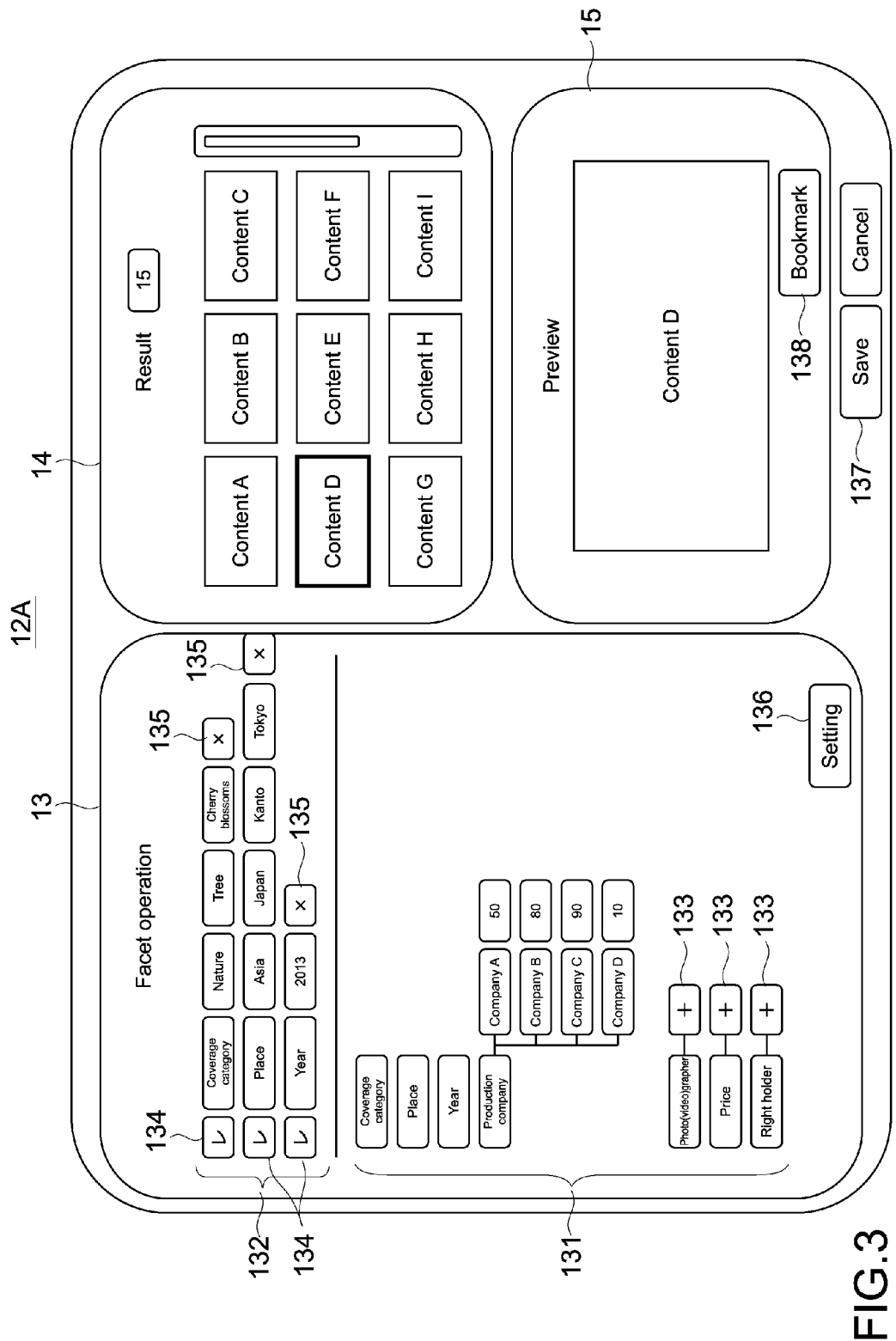
FIG. 3 A diagram showing an example of a main screen of the facet selection environment for users of own broadcast station.

FIG. 3 is a diagram showing an example of a main screen 12A of the facet selection environment for the user of own broadcast station.

The main screen 12A includes a facet operation area 13, a search result area 14, and a preview area 15.

The facet operation area 13 includes a facet selection operation environment 131 and a facet selection result display area 132. In the facet selection operation environment 131, the facet categories and facet values extracted from the facet maps can be displayed hierarchically in a tree structure. As the user selects a facet value of an arbitrary hierarchical level in an arbitrary facet category in the facet selection operation environment 131, facet information ranging from the selected arbitrary facet category to the selected facet value of the arbitrary hierarchical level is displayed in the facet selection result display area 132. It should be noted that when an arbitrary facet value of an arbitrary facet category is selected in the category menu 11, facet information ranging from the arbitrary facet category to the facet value of the arbitrary hierarchical level is displayed in the facet selection result display area 132 from the beginning.

In the facet selection operation environment 131, buttons 133 are provided with respect to the unselected facet categories as the facet selection result, and thus the user can grasp the unselected state. Further, when the button 133 is operated by the user, the facet values of the first hierarchical level, that belong to the relevant facet category, are displayed in place of the button 133. When there are facet values of a lower order than the facet values of the first hierarchical level, buttons are similarly displayed. Accordingly, facet values of lower hierarchical levels are sequentially displayed by the operation of the buttons 133.

In the facet information displayed in the facet selection result display area 132 as the facet selection result, check boxes 134 for switching whether to use the relevant facet information in the facet search and cancel buttons 135 for individually cancelling the facet selection result in a facet information unit are provided.

Control of the facet selection operation environment 131 described above is executed as the controller of the metadata management server 121 receives operation information transmitted from the user terminal 200A.

When a setting button 136 provided in the facet selection operation environment 131 is operated by the user, the controller of the metadata management server 121 generates, based on the operation information, a content search request including each facet information displayed in the facet selection result display area 132 as the facet selection result and transmits it to the metadata management server 121. Based on the facet information included in the received content search request, the controller of the metadata management server 121 searches a metadata database and judges relevant contents. The metadata management server 121 reads out information requisite for accessing thumbnail images, preview moving images, and the like of the judged contents from the metadata database and sends them back to the metadata delivery server 124.

Based on the information received from the metadata management server 121, the controller of the metadata delivery server 124 acquires thumbnail images displayed in the search result area 14 of the facet selection environment main screen 12A from the content management system 112, updates the facet selection environment main screen 12A, and transmits the updated main screen 12A to the user terminal 200A.

Accordingly, the user of the user terminal 200A can check a list of contents narrowed down by the facet search. Moreover, the number of contents to which the contents have been narrowed down is also displayed in the search result area 14 of the main screen 12A. In the example shown in FIG. 3, the number of contents to which the contents have been narrowed down is "15".

In the list of contents, the user can select an arbitrary content and view a part of the content as a preview in the preview area 15. As the user sets a bookmark by operating a bookmark button 138 with respect to favorite contents upon viewing previews and the like, information such as a URL (Uniform Resource Locator) requisite for accessing content data is stored in the user terminal 200A.

Further, a save button 137 is provided on the facet operation screen. By operating the save button 137, the list of contents narrowed down by the facet search can be stored with the facet information. It is also possible to reproduce the facet selection environment main screen 12A based on the stored information.

Figure 4:
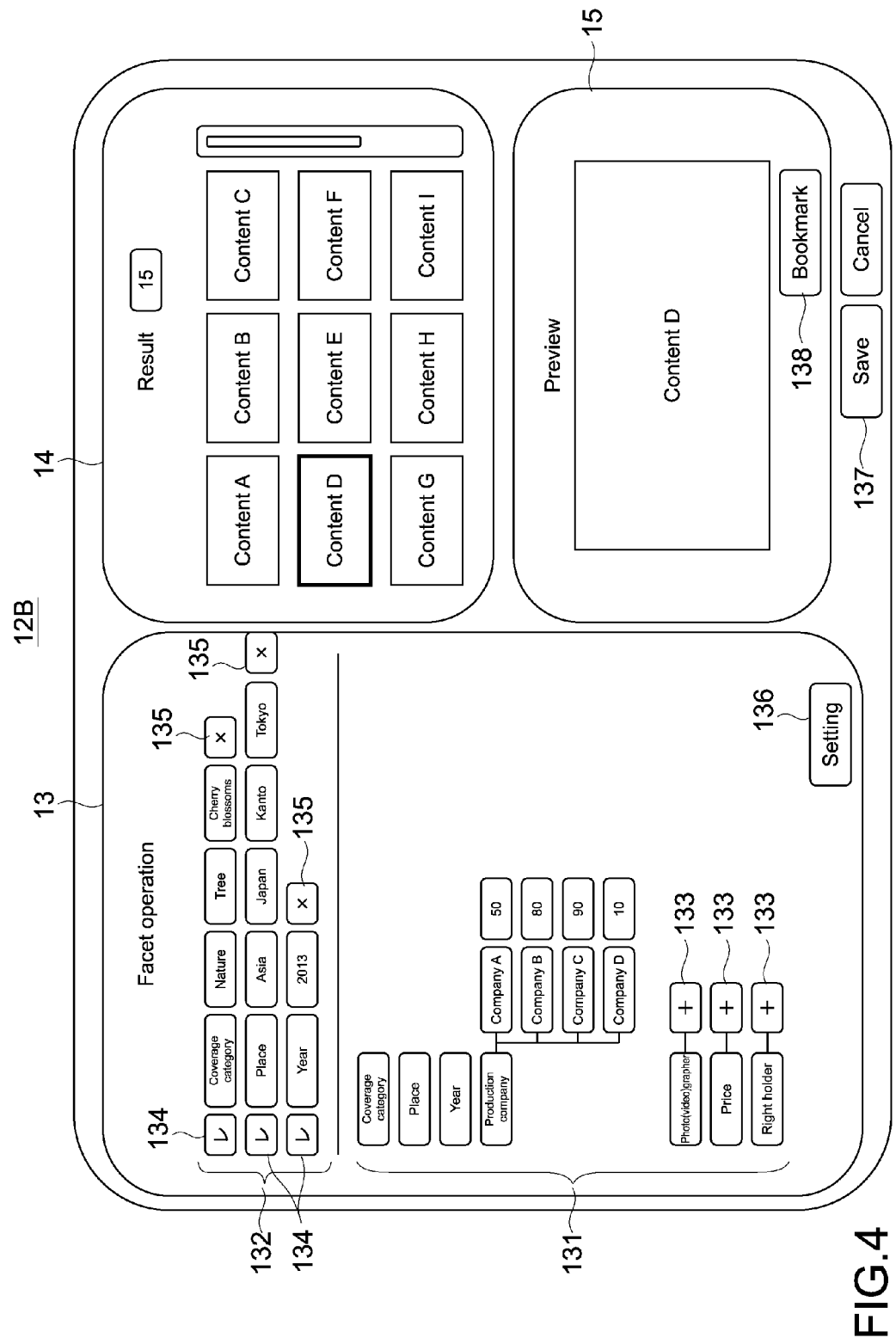
FIG. 4 A diagram showing an example of the main screen of the facet selection environment for users of another broadcast station.

FIG. 4 is a diagram showing an example of a facet selection environment main screen 12B for the user of another broadcast station.

The user of the user terminal 200B is a user in another broadcast station. Therefore, the controller of the metadata delivery server 124 acquires a facet map corresponding to the usage style of the user in the another broadcast station by the facet map server 125, generates the facet selection environment main screen 12B for the facet navigation based on the facet map, and transmits it to the user terminal 200B.

In the example shown in FIG. 4, in the facet selection environment main screen 12B displayed in the user terminal 200B, a facet category unique to the user of another broadcast station, such as "price" corresponding to an item of a content usage fee, is provided.

Figure 5:
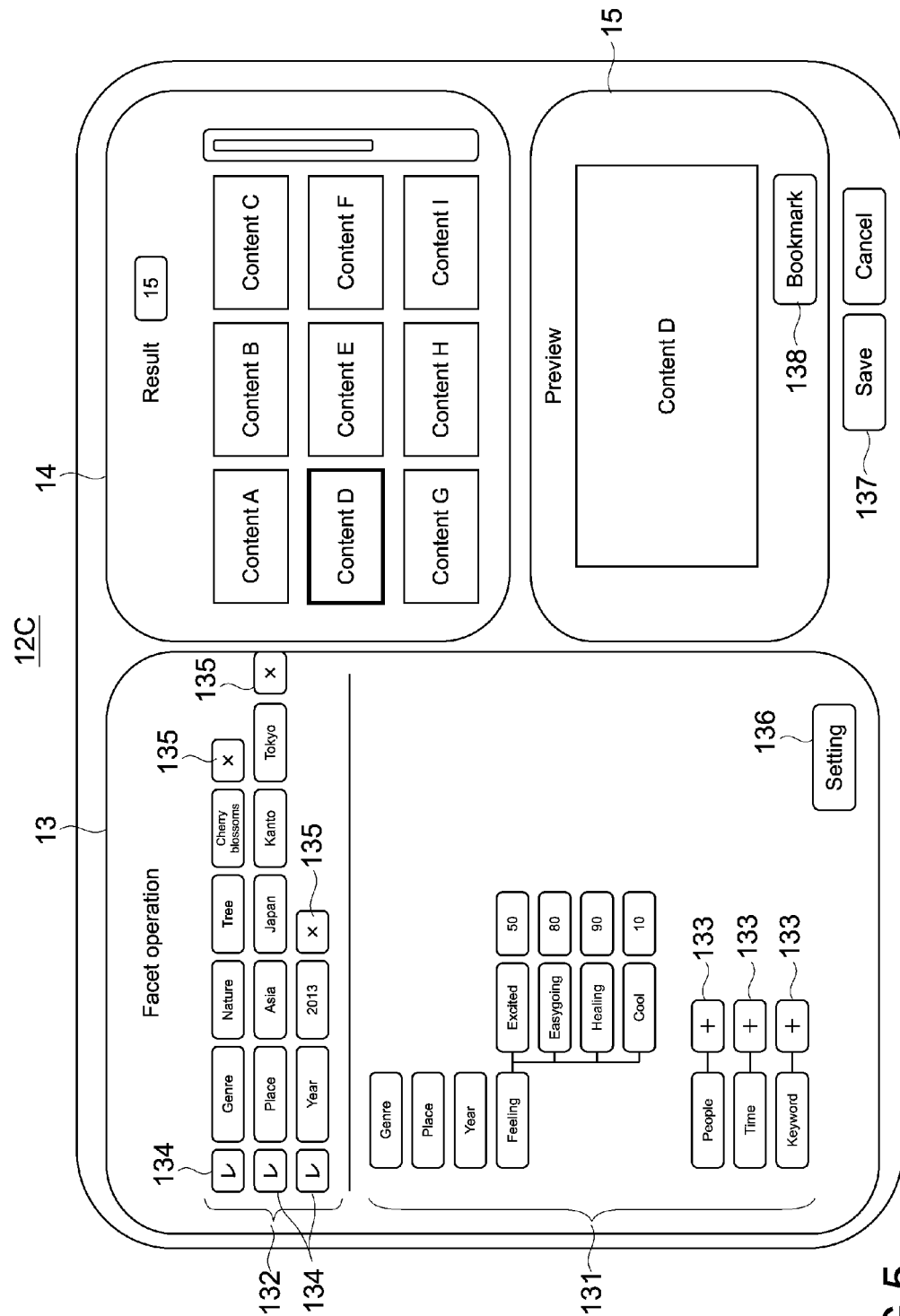
FIG. 5 A diagram showing an example of the main screen of the facet selection environment for general users.

FIG. 5 is a diagram showing an example of a facet selection environment main screen 12C for general users.

In the facet selection environment main screen 12C for general users, facet categories and facet values based on a facet map corresponding to the usage style of general users are displayed. For example, "genre", "feeling", and "time" are facet categories extracted from the facet map corresponding to the usage style of general users. Further, "excited", "easygoing", "healing", and "cool" displayed as the facet values of the facet category "feeling" are facet values extracted from the facet map corresponding to the usage style of general users.

Also on the facet selection environment main screen 12C, the user can select a keyword that does not exist in the facet categories and facet values of the facet map, from a prepared keyword group. For example, a button 139 for displaying a list of "keywords" is provided in the facet operation area 13. As the button 139 is operated by the user, a list of preregistered keywords is displayed. The user can select an arbitrary keyword from the list of keywords as one condition for the facet search.

The controller of the metadata management server 121 transmits the keyword selected by the general user of the user terminal 200C to the facet map server 125. The controller of the facet map server 125 manages usage counts of the acquired keywords for each keyword type, and when a usage count of the newly-updated keyword satisfies a preset facet map extension condition (extension definition value), executes processing of extending the facet map corresponding to the usage style of general users. The facet map extension processing will be described later.

It should be noted that the control of the servers and terminals described above is performed by the CPUs inside the controllers of the respective apparatuses executing programs stored in the main memories.

As described above, in this embodiment, the facet map of each usage style is managed by the facet map server 125. The controller of the metadata delivery server 124 creates the facet selection environments based on the facet maps corresponding to the usage styles of the users of the user terminals 200A, 200B, and 200C and transmits the facet selection environments to the user terminals 200A, 200B, and 200C for them to be displayed. Therefore, the users can select facets in the facet selection environments that suit the usage styles, and thus an improvement in operability is expected.

Next, operations regarding the facet map extension will be described.

(3-2. Facet Map Management and Extension Setting)

A facet map manager exists in the facet navigation system 10 of this embodiment. The facet map manager operates the facet map management terminal 126 to perform an edit such as an addition, deletion, and change of facet categories and facet values in facet maps.

Figure 6:
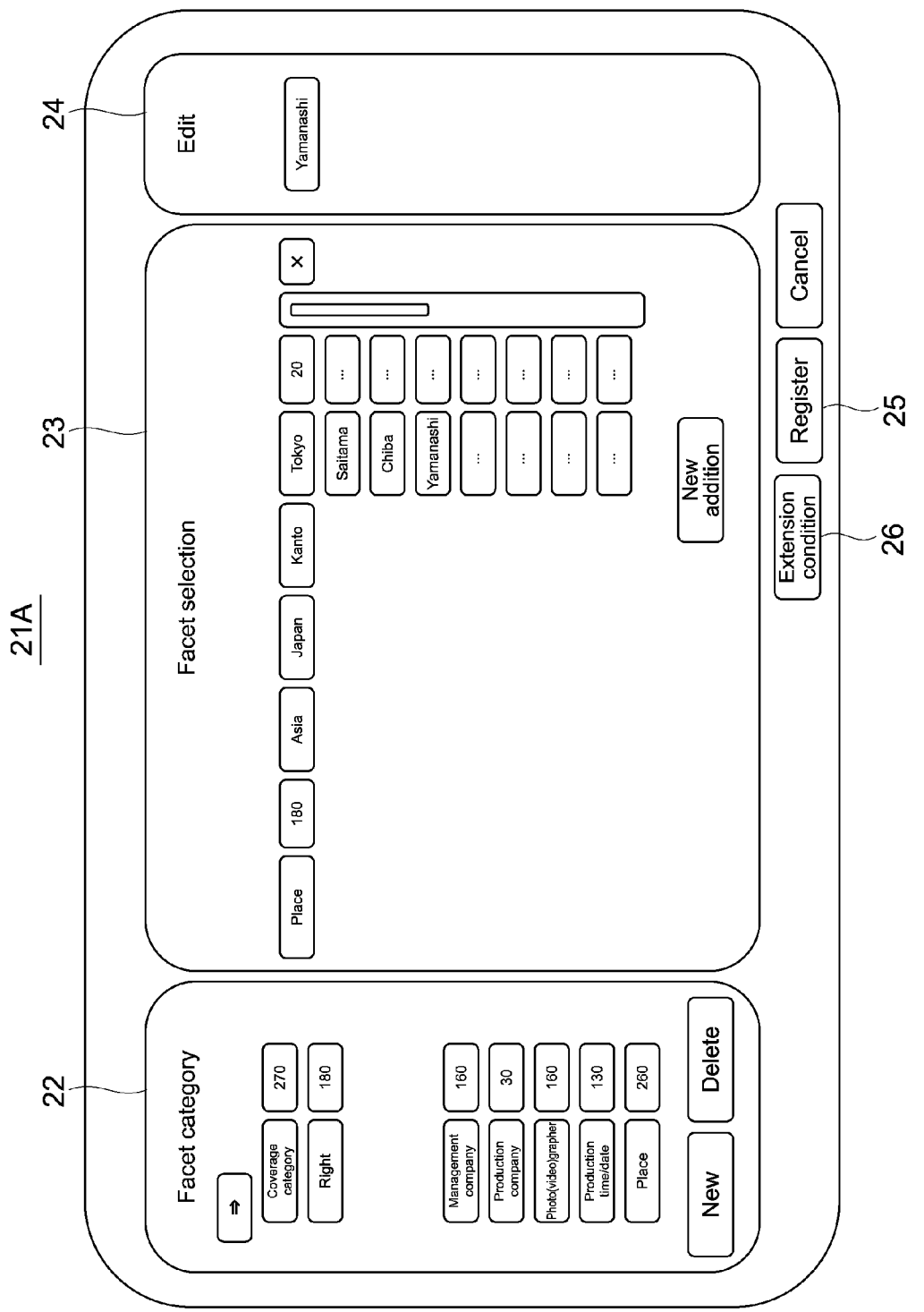
FIG. 6 A diagram showing an example of a management screen for a facet map corresponding to a usage style of own broadcast station.

FIG. 6 is a diagram showing an example of a facet map management screen 21A corresponding to the usage style of own broadcast station.

Control of the facet map management screen 21A is executed by the facet map server 125. The controller of the facet map management terminal 126 acquires information on the facet map management screen 21A from the facet map server 125 and displays it on the display. The controller of the facet map management terminal 126 transmits operation information of the facet map manager with respect to the facet map management screen 21A to the facet map server 125. Based on the operation information from the facet map management terminal 126, the controller of the facet map server 125 updates the facet map management screen 21A and sends back the update result to the facet map management terminal 126.

In the facet map management screen 21A, a category edit area 22, a facet value selection area 23, and a facet value edit area 24 are provided.

In the category edit area 22, a list of set facet categories is displayed. In the category edit area 22, the facet categories can be added, deleted, etc. by operations of the facet map manager.

In the facet value selection area 23, facet values of the facet category selected in the category edit area 22 are displayed hierarchically. Also in the facet value selection area 23, facet values of a new hierarchical level can be added, deleted, etc. by operations of the facet map manager.

In the facet value edit area 24, the facet value selected in the facet value selection area 23 can be changed to a different value by an operation of the facet map manager.

Further, in the category edit area 22, the number of corresponding contents is displayed with respect to each facet category. Similarly, in the facet value selection area 23, the number of corresponding contents is displayed with respect to facet values of the bottom hierarchical level.

A registration button 25 is provided in the facet map management screen 21A. By operating the registration button 25, the edit results of the category edit area 22, the facet value selection area 23, and the facet value edit area 24 are reflected onto corresponding facet maps stored in the facet map database of the facet map server 125. Furthermore, a button 26 for invoking a facet map extension condition creation screen is provided on the facet map management screen 21A.

Figure 7:
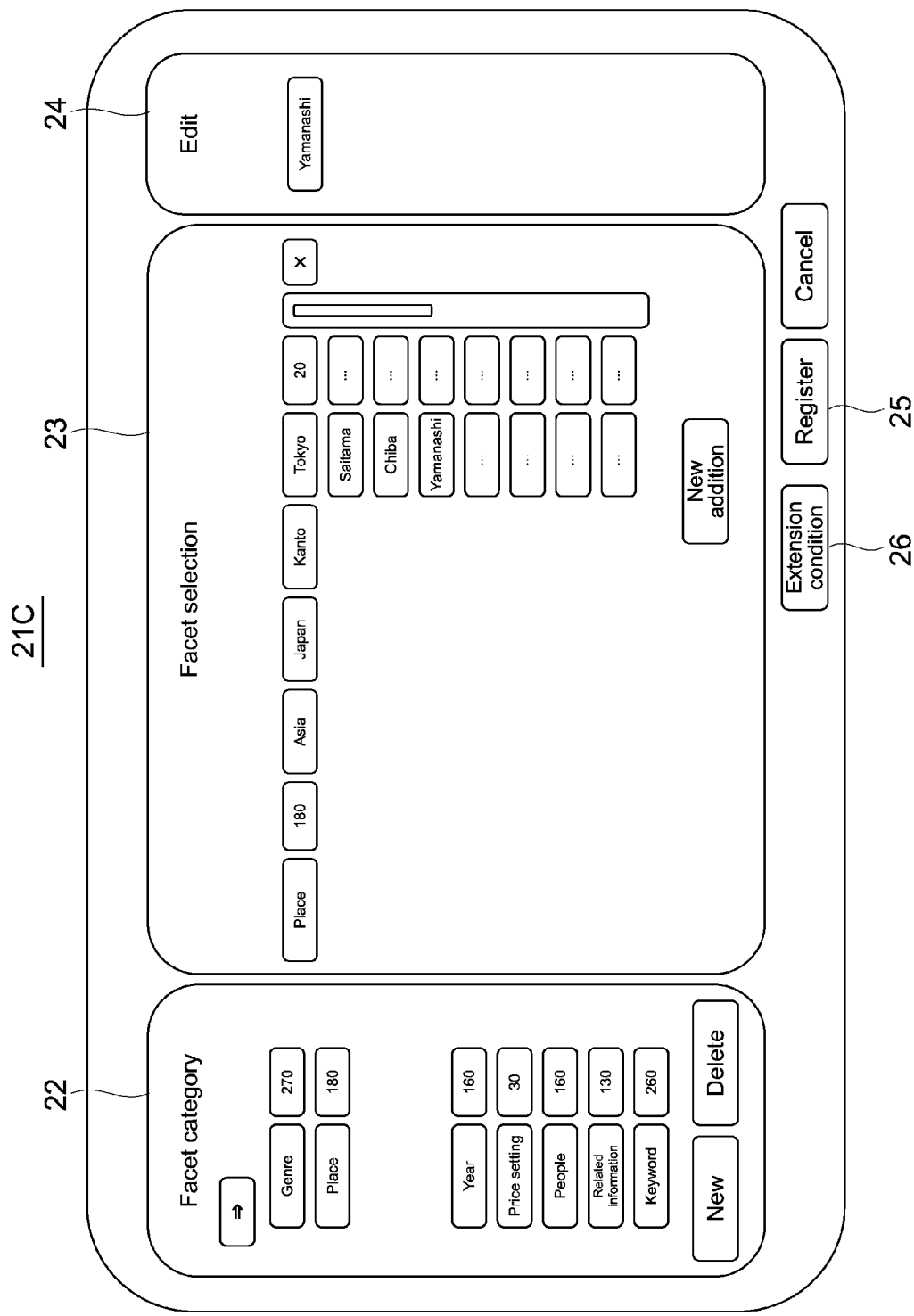
FIG. 7 A diagram showing an example of the management screen for a facet map corresponding to a usage style of general users.

FIG. 7 is a diagram showing an example of the facet map management screen 21C corresponding to the usage style of general users. In the category edit area 22 of the facet map management screen 21C, an addition, deletion, etc. of keywords can also be performed in addition to the addition and deletion of facet categories. Further, the button 26 for invoking the facet map extension condition creation screen is provided on the facet map management screen 21C.

Figure 8:
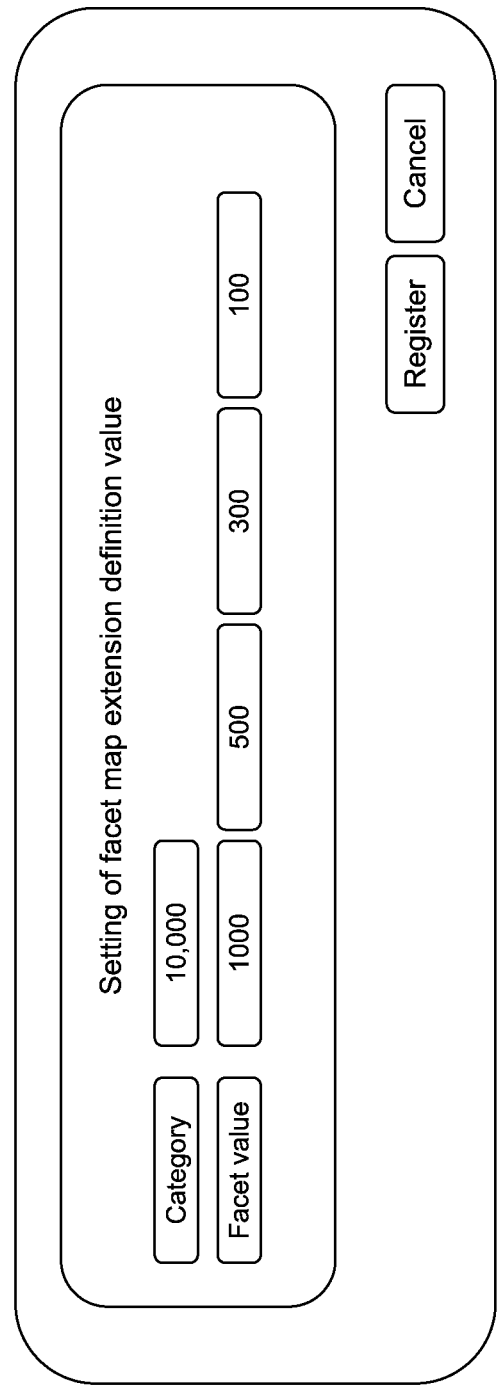
FIG. 8 A diagram showing an example of an extension condition creation screen for creating an extension definition value as a facet map extension condition.

FIG. 8 is a diagram showing an example of the extension condition creation screen 31 for creating an extension definition value as a facet map extension condition.

As shown in the figure, in the extension condition creation screen 31, an extension definition value as a facet category addition condition and an extension definition value of each hierarchical level, that is a facet value addition condition of each hierarchical level, are determined individually by the operation of the facet map manager.

It should be noted that it is also possible to allow a cycle of resetting a count result of a usage count of a keyword to be set on the extension condition creation screen 31 instead of the extension definition value. In this case, the extension definition value is a fixed value.

(3-3. Registration of Content Metadata)

Next, operations of creating content metadata by the metadata creation terminal 122 and registering it in the metadata management server 121 will be described.

Figure 13:
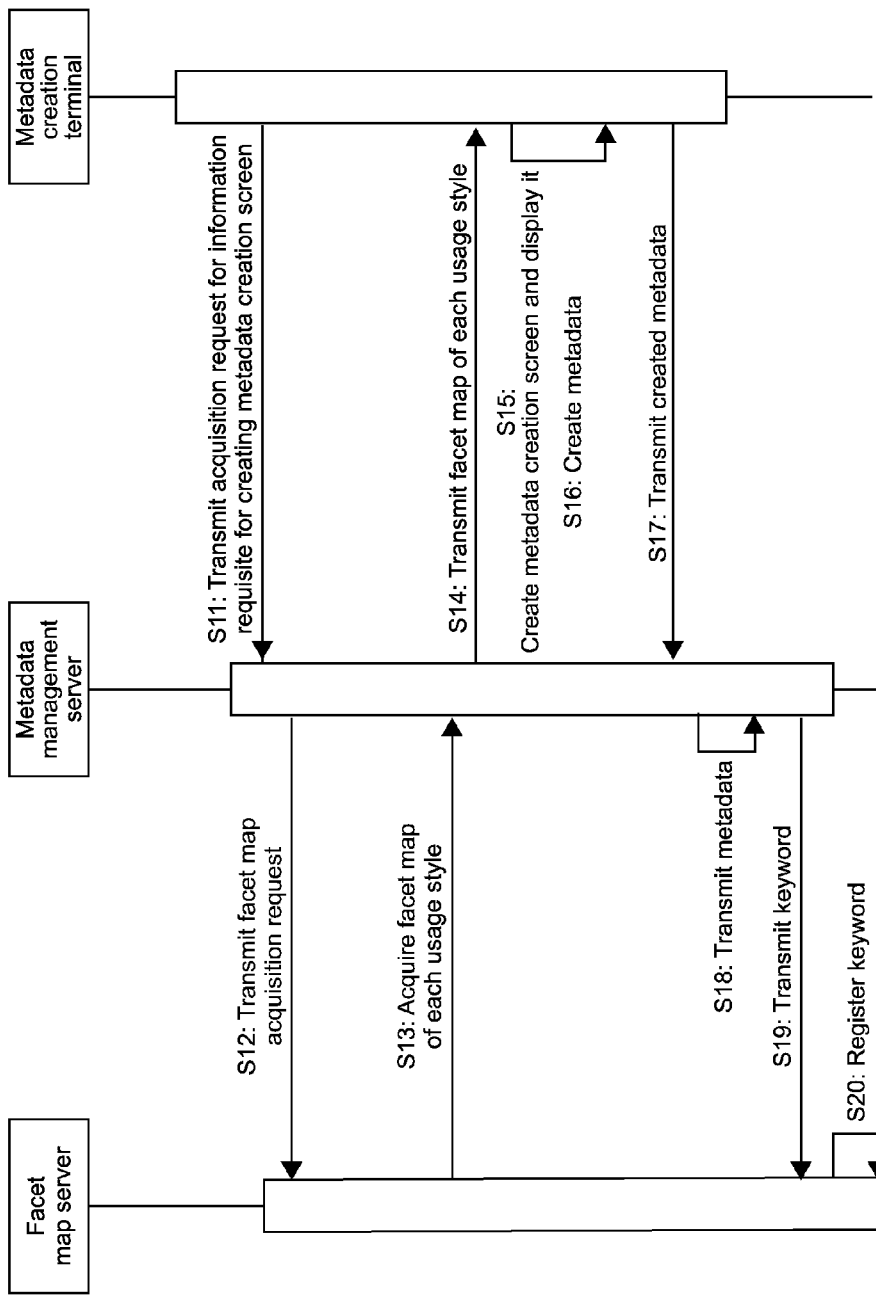
FIG. 13 A diagram showing information exchanges among a metadata creation terminal, a metadata management server, and the facet map server when registering metadata.

FIG. 13 is a diagram showing information exchanges among the metadata creation terminal 122, the metadata management server 121, and the facet map server 125 when registering metadata.

First, the controller of the metadata creation terminal 122 requests the metadata management server 121 to acquire information requisite for creating a metadata creation screen (S11). Upon receiving the request from the metadata creation terminal 122, the controller of the metadata management server 121 acquires a facet map of each usage style from the facet map server 125 (S12, S13).

The controller of the metadata management server 121 transmits the acquired facet map of each usage style to the metadata creation terminal 122 (S14). The controller of the metadata creation terminal 122 creates a metadata creation screen based on the acquired facet map of each usage style and causes the display to display it (S15).

Figure 9:
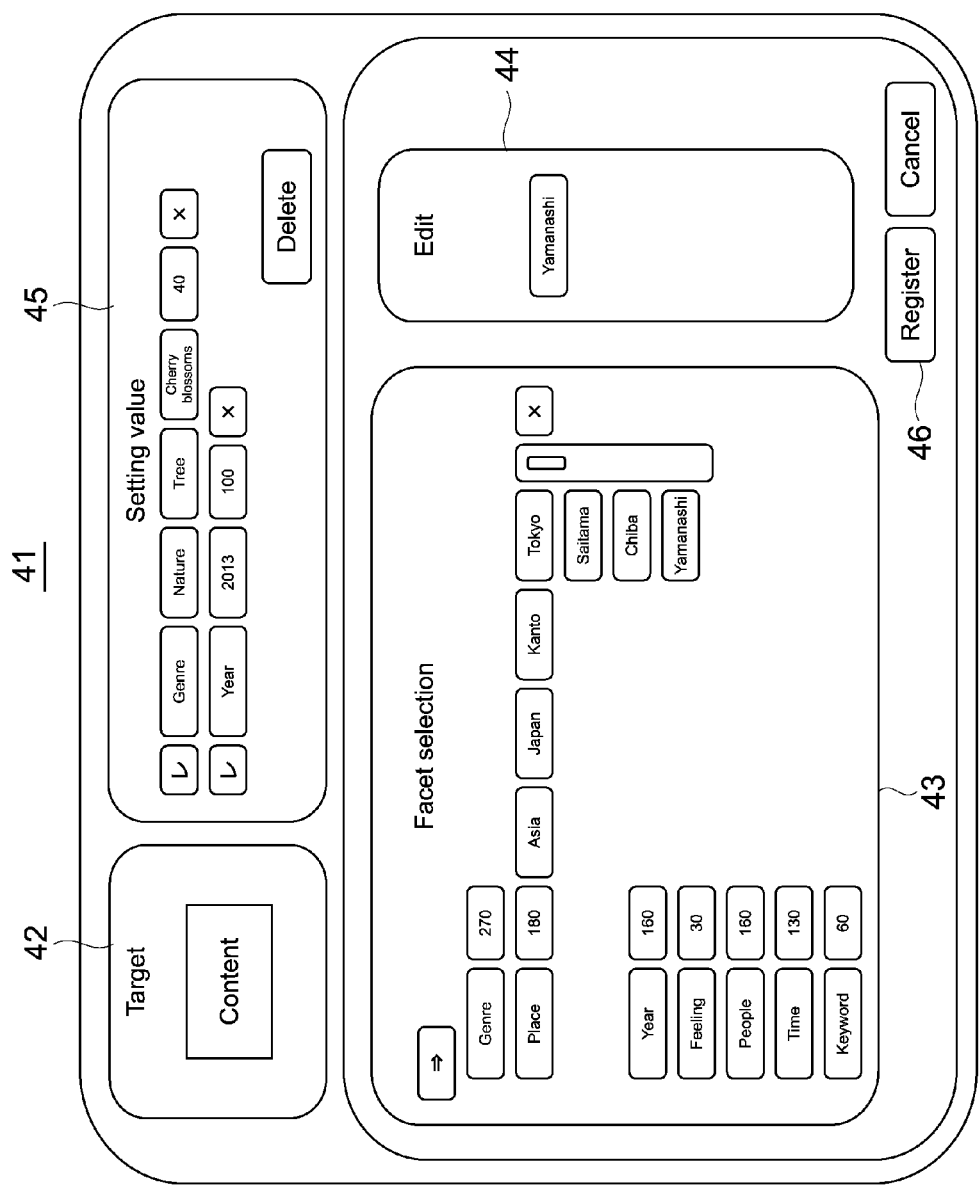
FIG. 9 A diagram showing an example of a metadata creation screen.

FIG. 9 is a diagram showing an example of a metadata creation screen 41.

The metadata creation screen 41 includes a content display area 42, a facet selection area 43, a facet value edit area 44, and a setting value display area 45.

The content display area 42 is an area for displaying a thumbnail image, a preview image, or the like of a content for which metadata is to be created.

In the facet selection area 43, facet categories and facet values extracted from facet maps are displayed hierarchically in a tree structure as in the facet selection operation environment 131 of the user terminals 200A, 200B, and 200C. As the metadata creator selects an arbitrary facet category and a facet value of an arbitrary hierarchical level in the facet selection area 43, facet information ranging from the selected arbitrary facet category to the selected facet value of the arbitrary hierarchical level is additionally displayed in the setting value display area 45.

Further, in the facet value edit area 44, the facet value selected in the facet selection area 43 can be changed to a different value by the metadata creator. In other words, the metadata creator can create metadata in which a new keyword is set as a new facet value belonging to an existing facet category.

Furthermore, when some kind of a value is input to the facet value edit area 44 in a state where a part where "keyword" is displayed with the facet categories is selected in the facet selection area 43, that value is set as a new facet category. In addition, a facet value of the new facet category can also be set using the facet value edit area 44. Accordingly, it is possible to create metadata in which the new keyword is set as the new facet category and another new keyword is set as the new facet value (S15).

It should be noted that in the facet selection area 43, the number of contents corresponding to the facet category is also displayed.

In the setting value display area 45, a check box 47 for switching whether to enable the setting value as the metadata and a cancel button 48 for individually cancelling the setting value are provided.

Also in the setting value display area 45, the number of contents corresponding to the setting value is displayed.

Referring back to FIG. 13, as the registration button 46 provided on the metadata creation screen 41 is operated by the metadata creator, the controller of the metadata creation terminal 122 transmits the setting value displayed in the setting value display area 45 to the metadata management server 121 as target content metadata (S17). The controller of the metadata management server 121 registers the metadata acquired from the metadata creation terminal 122 in the metadata database as a keyword set as the facet category (S18).

Further, the controller of the metadata management server 121 transmits a keyword set as a new facet category and a keyword set as a new facet value by the metadata creator in the registered metadata to the facet map server 125 (S19). At this time, the controller of the metadata management server 121 also transmits information indicating which facet value of what hierarchical level of what facet category the keyword set as the facet value is. As a result, the keyword is stored in the facet map server 125 (S20).

It should be noted that in the metadata creation terminal 122, the thumbnail image, preview image including audio, and the like of the target content are decoded and displayed. In this regard, the metadata creation terminal 122 may extract a keyword related to the content by information processing such as a face recognition and an audio analysis and automatically select a facet category and facet value to create metadata.

Moreover, when a new keyword is set by the metadata creator, keywords of the same meaning but different expressions may be input. For example, the keyword "lively" may be expressed as "clattering", "loud", "powerful", or the like depending on that person. When assuming a mechanism of extending a facet map by adding a keyword having a high usage frequency to the facet map, the mixture of synonymous keywords inhibit an appropriate extension from being realized.

In this regard, when a new keyword is input by the metadata creator, it is desirable to replace the input keyword with a most generally-used keyword of the same meaning to be set. As a method of realizing this, there is a method of accessing a dictionary that stores correspondences between most generally-used keywords and keywords synonymous with those keywords. The dictionary may be installed in the facet map server 125, or may be installed in an external server so as to be capable of accessing it from the facet map server 125.

(3-4. Extension of Facet Map)

The keywords registered in the facet map server 125 are incorporated into, as the usage frequency of the user of each usage style reaches a predetermined value, the facet map corresponding to the usage style. In other words, the facet map is automatically extended.

Hereinafter, the extension of the facet map corresponding to the usage style of general users will be described, but the same holds true for the extension of facet maps corresponding to other usage styles.

Figure 14:
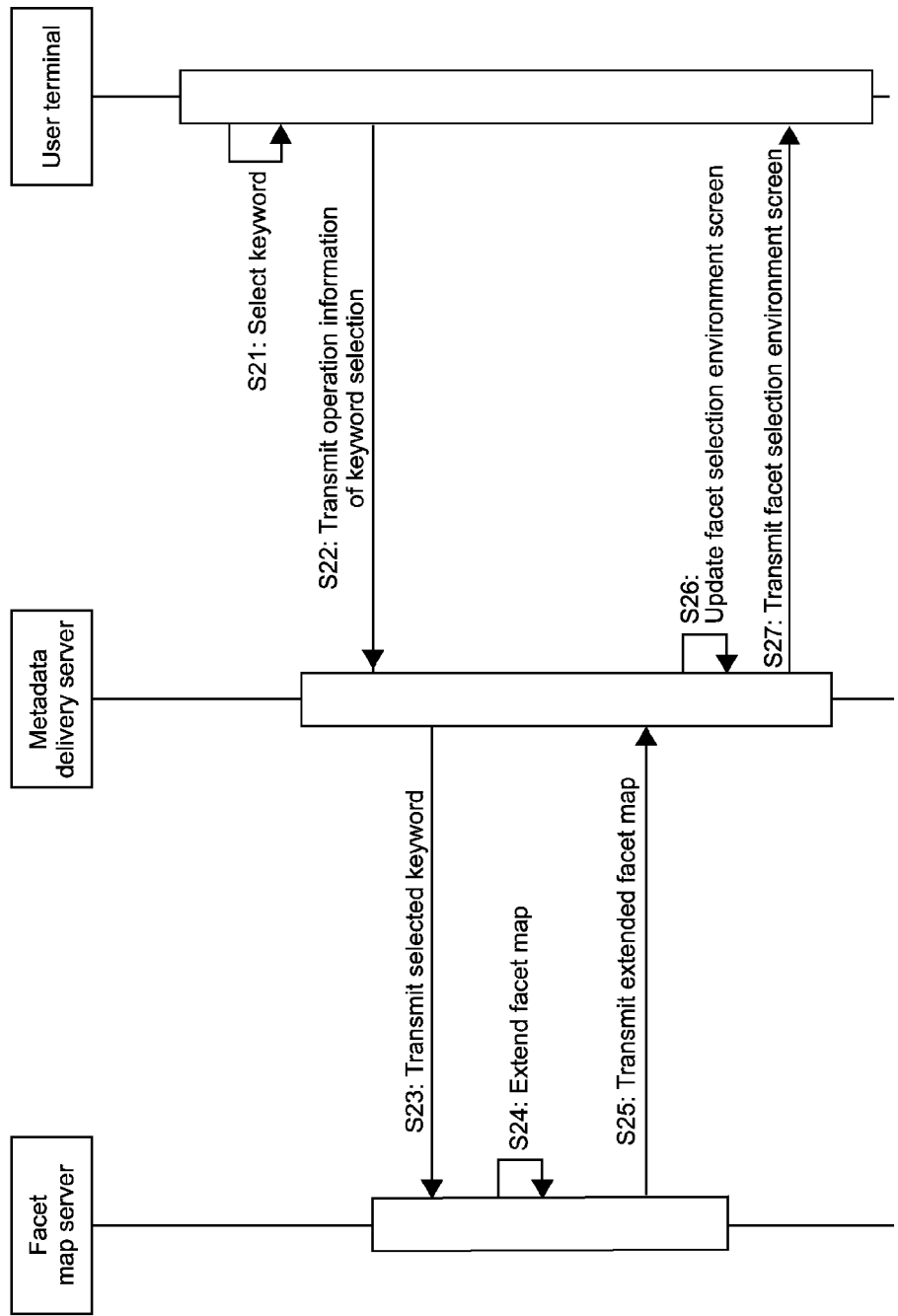
FIG. 14 A diagram showing information exchanges among the user terminal, the metadata delivery server, and the facet map server, that are related to facet map extension processing.
Figure 15:
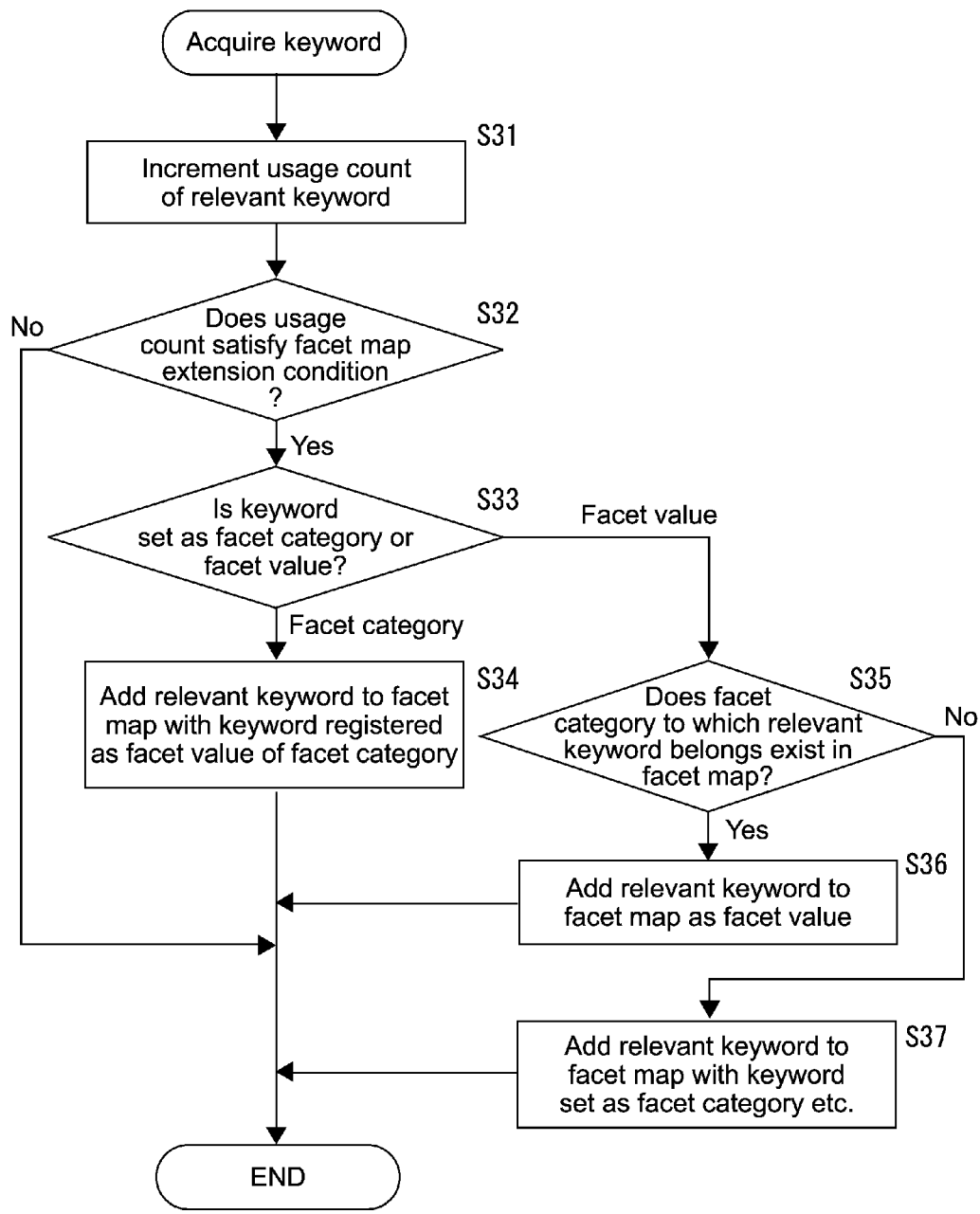
FIG. 15 A diagram showing a flow of the facet map extension processing by the facet map server.

FIG. 14 is a diagram showing information exchanges among the user terminal 200C, the metadata delivery server 124, and the facet map server 125, that are related to facet map extension processing. FIG. 15 is a flowchart showing a flow of the facet map extension processing by the controller of the facet map server 125.

It is assumed that the facet selection environment main screen 12C (FIG. 5) is displayed on the display of the user terminal 200C. When an operation of selecting, as a facet search condition, a keyword that does not exist as the facet category nor the facet value in the facet map is made by the user (FIG. 14: S21), the controller of the user terminal 200C transmits the operation information to the metadata delivery server 124 (FIG. 14: S22).

Based on the acquired operation information, the controller of the metadata delivery server 124 transmits the selected keyword to the facet map server 125 (FIG. 14: S23).

Upon acquiring the selected keyword, the controller of the facet map server 125 increments a usage count of the keyword (FIG. 15: S31). The controller of the facet map server 125 then judges whether the incremented usage count satisfies the preset facet map extension condition (FIG. 15: S32). This judgment is carried out depending on whether the usage count has reached the extension definition value when the extension definition value is set as the extension condition, for example. When the usage count has reached the extension definition value, it is judged that the extension condition is satisfied.

Further, when an extension definition value as a facet category addition condition and an extension definition value for each hierarchical level of facet values are set for the extension definition value, the judgment is carried out as follows. Specifically, in the facet map server 125, information indicating whether a keyword is a keyword set as a facet category or which hierarchical level the keyword belongs to as a facet value, is registered for each keyword type. Based on the registration information, the controller of the facet map server 125 judges an extension definition value to be applied to the currently-acquired keyword and judges whether a usage count of the keyword satisfies the preset facet map extension condition.

Next, the controller of the facet map server 125 judges whether the keyword satisfying the extension condition is a keyword set as a facet category or a keyword set as a facet value (FIG. 15: S33).

When judging that the keyword satisfying the extension condition is a keyword set as a facet category (FIG. 15: Facet category in S33), the controller of the facet map server 125 adds the keyword to the facet map as the keyword set as a facet value of the facet category (FIG. 15: S34).

When judging that the keyword satisfying the extension condition is a keyword set as a facet value (FIG. 15: Facet value in S33), the controller of the facet map server 125 judges, based on information indicating which hierarchical level of what facet category the keyword belongs to as a facet value, whether the facet category to which the keyword belongs or a facet value of a higher-order hierarchical level already exists in the facet map (FIG. 15: S35). When there is a facet category to which the keyword (facet value) belongs or a facet value of a higher-order hierarchical level in the facet map (FIG. 15: YES in S35), the controller of the facet map server 125 adds the keyword to the facet map as a facet value of the relevant hierarchical level in the relevant facet category (FIG. 15: S36).

Further, when a facet category to which the keyword (facet value) belongs or a facet value of a higher-order hierarchical level does not exist in the facet map (FIG. 15: No in S35), the controller of the facet map server 125 adds the keyword to the facet map along with keywords of the facet categories or facet values of the higher-order hierarchical level (FIG. 15: S37).

The facet map extension is carried out as described above (FIG. 14: S24).

The controller of the facet map server 125 transmits the extended facet map to the metadata delivery server 124 (FIG. 14: S25). The controller of the metadata delivery server 124 updates the facet selection environment main screen 12C based on the extended facet map (FIG. 14: S26) and transmits the updated facet selection environment main screen 12C to the user terminal 200C (FIG. 14: S27).

It should be noted that the control of the servers and terminals described above is performed by the CPUs inside the controllers of the respective apparatuses executing programs stored in the main memories.

Figure 10:
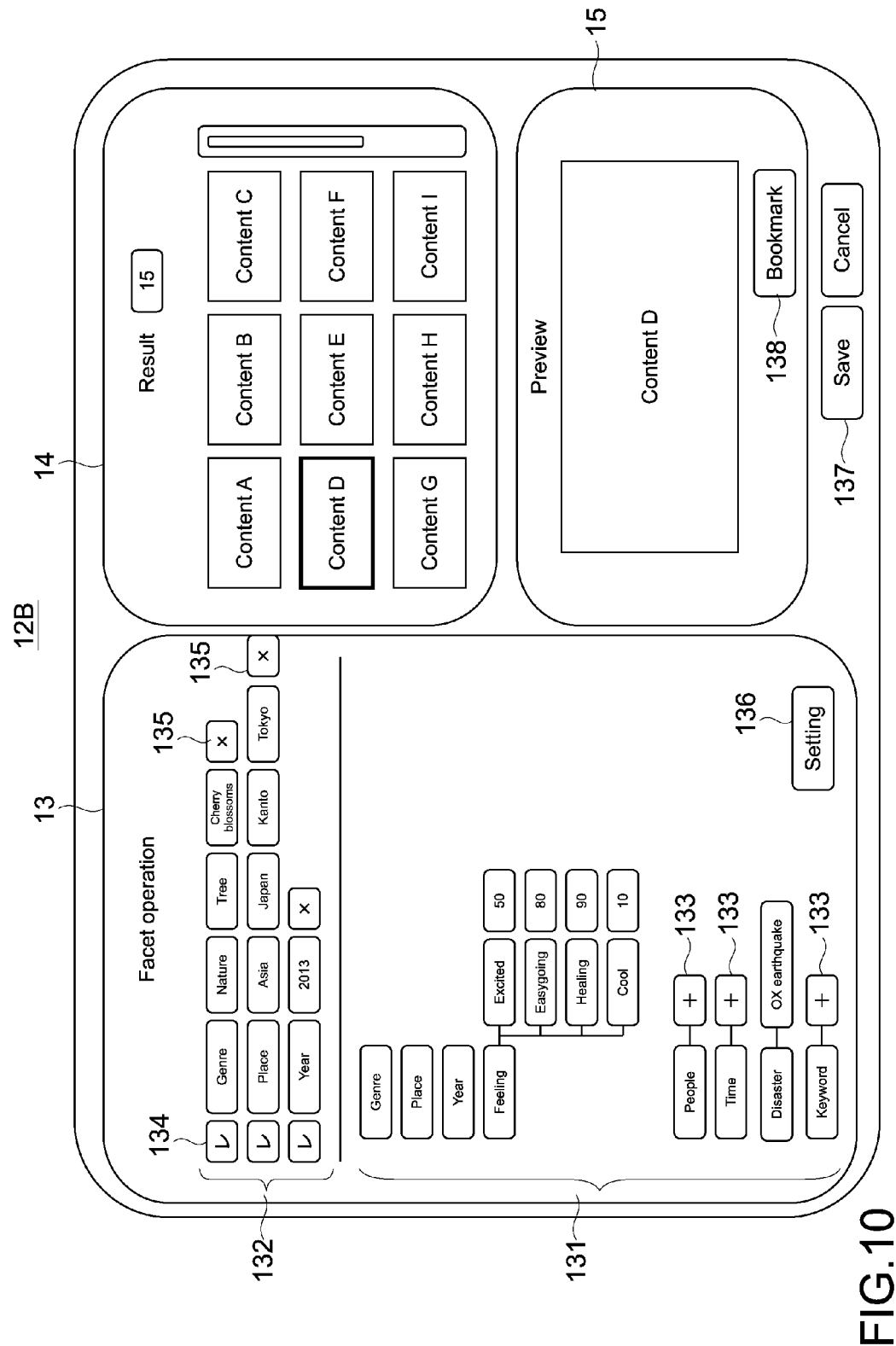
FIG. 10 A diagram showing an update example of a facet selection environment in a user terminal by an extension of a facet map.

FIG. 10 is a diagram showing the facet selection environment main screen 12C of the user terminal 200A in a case where "disaster" as a new facet category and "OX earthquake" as a new facet value are added to a facet map.

Figure 11:
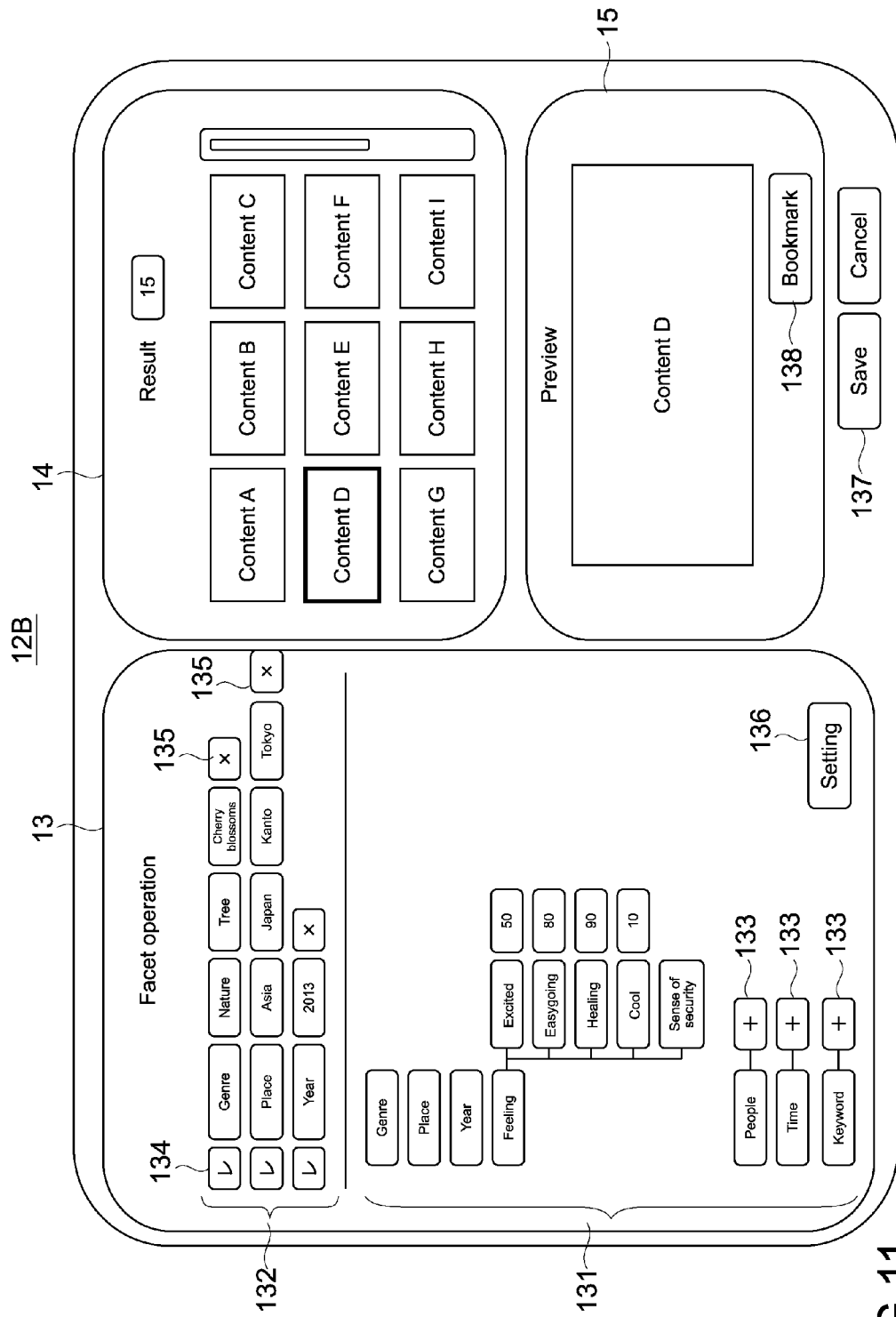
FIG. 11 A diagram showing another update example of the facet selection environment in the user terminal by the extension of a facet map.

FIG. 11 is a diagram showing the facet selection environment main screen 12C of the user terminal 200A in a case where "sense of security" as a new facet value is added below "feeling" as the existing facet category in the facet map.

As described above, according to this embodiment, the metadata creator can set a new keyword that does not exist in the existing facet map as necessary when creating content metadata. Accordingly, metadata creation efficiency is improved.

Moreover, a keyword that is set by the metadata creator and whose usage frequency in a facet search by general users satisfies a predetermined condition is automatically added to the facet map as a new facet category and facet value. Accordingly, facet selection efficiency for a facet search by general users is improved.

Further, the addition of keywords used by other users to the facet map leads to an unexpected discovery of facet categories and facet values in selecting a facet in the facet selection environment. Accordingly, various searches across various matters becomes possible without being biased to matters known by an individual.

Modified Example 1

In the embodiment above, the usage styles are categorized into a user of own broadcast station, a user of another broadcast station, and general users. However, in the present technique, the usage style may be categorized more finely based on various viewpoints. For example, general users may be categorized more finely based on an occupation, age-group, hobby, and the like.

Modified Example 2

In the embodiment above, the metadata management server 121, the user management server 123, the metadata delivery server 124, and the facet map server 125 are structured as different servers. However, the functions of the servers requisite for structuring the facet navigation system may be integrated in a single computer such as a server or in a smaller number of computers.

Modified Example 3

In the embodiment above, the facet map is extended for each usage style. However, the present technique is not limited thereto. For example, all facet maps or a plurality of facet maps having a commonality in usage styles (e.g., own broadcast station and other broadcast stations) may be extended simultaneously with respect to the same element.

The present technique may also take the following structures.

(1) An information processing apparatus, including
a control section that
provides, to a terminal of a user, a relationship among a plurality of keywords each as an element constituting a facet that is used as an index for searching for a content, as a facet map, and a facet selection environment that is based on at least one keyword addable to the facet map as a new element of the facet,
calculates a usage frequency of each of the keywords in the terminal, and
adds a keyword whose calculated usage frequency satisfies a predetermined condition to the facet map as the new element of the facet.

(2) The information processing apparatus according to (1),
in which the control section
provides, to a terminal of a creator creating content metadata, information on a metadata creation screen into which the creator can input, as a new element of the metadata, at least one keyword addable as the new element of the facet,
stores the at least one keyword input as the new element of the facet on the metadata creation screen, and
provides, to the terminal of the user, the facet selection environment that is based on the facet map and the at least one stored keyword.

(3) The information processing apparatus according to (1) or (2),
in which the facet is constituted of at least a facet category and a facet value belonging to the facet category, and
in which different conditions are set for a keyword set as the facet category and a keyword set as the facet value.

(4) The information processing apparatus according to any one of (1) to (3),
in which the facet map exists for each predetermined usage style for categorizing the user, and
in which the control section provides the facet selection environment that is based on a facet map corresponding to the usage style of the user who has requested the facet selection environment and the at least one keyword addable as the new element of the facet.

(5) The information processing apparatus according to any one of (1) to (4),
in which the control section adds, as the new element, a keyword whose calculated usage frequency satisfies a predetermined condition to the facet map corresponding to the usage style of the user who has requested the facet selection environment.

DESCRIPTION OF REFERENCE NUMERALS

10 facet navigation system
100 broadcast station
110 video system
112 content management system
114 broadcast transmission system
116 network delivery system
118 content creator terminal
120 metadata system
121 metadata management server
122 metadata creation terminal
123 user management server
124 metadata delivery server
125 facet map server
126 facet map management terminal

The invention claimed is:

1. An information processing apparatus, comprising:
a memory configured to store at least one facet map corresponding to at least one user,
wherein the at least one facet map indicates a relationship among a plurality of facet elements, and
wherein each of the plurality of facet elements indicates an attribute of content; and
circuitry configured to:
generate a facet selection environment based on the stored at least one facet map;
transmit the generated facet selection environment to a user terminal corresponding to the at least one user;
wherein the user terminal displays a facet selection screen corresponding to the generated facet selection environment, and
wherein at least one keyword is added to a list of the plurality of the facet elements that is displayed on the facet selection screen, based on a first user input;
receive, operation information corresponding to a second user input on the facet selection screen and the at least one keyword, from the user terminal;
calculate a first usage frequency of the added at least one keyword in the user terminal, based on the received operation information;
update the stored at least one facet map to include the at least one keyword as a new facet element corresponding to the content, based on the calculated first usage frequency that satisfies a first condition; and
transmit, the facet selection environment corresponding to the updated at least one facet map, to the user terminal.

2. The information processing apparatus according to claim 1, wherein the
circuitry is configured to generate second information corresponding to a metadata creation screen to receive the at least one keyword as an input of a second user and as the new facet element.

3. The information processing apparatus according to claim 2, wherein each of the plurality of facet elements includes at least a facet category and a facet value belonging to the facet category, and wherein the circuitry is further configured to set a second condition for a first keyword that is set as the facet category and set a third condition for a second keyword that is set as the facet value.

4. The information processing apparatus according to claim 1, wherein the circuitry is further configured to, categorize the user corresponding to a plurality of usage styles, based on a corresponding facet map for each of the plurality of usage styles, and wherein the facet selection environment is further generated based on the at least one facet map corresponding to a usage style of the plurality of usage styles of the at least one user that has requested the facet selection environment and a first keyword that is added as the new facet element.

5. The information processing apparatus according to claim 4, wherein the circuitry is further configured to add, as the new facet element, the first keyword with a second usage frequency that satisfies a second condition to the at least one facet map corresponding to the usage style of the at least one user.

6. An information processing method, comprising:

generating a facet selection environment based on at least one facet map that is stored in a memory, wherein the at least one facet map indicates a relationship among a plurality of facet elements, and wherein each of the plurality of facet elements indicates an attribute of content;

transmitting the generated facet selection environment to a user terminal corresponding to at least one user, wherein the user terminal displays a facet selection screen corresponding to the generated facet selection environment, and wherein at least one keyword is added to a list of the plurality of the facet elements that is displayed on the facet selection screen, based on a first user input;

receiving, operation information corresponding to a second user input on the facet selection screen and the at least one keyword, from the user terminal;

calculating a usage frequency of the added at least one keyword in the user terminal, based on the received operation information;

updating the stored at least one facet map to include the at least one keyword as a new facet element corresponding to the content, based on the calculated usage frequency that satisfies a first condition; and transmitting, the facet selection environment corresponding to the updated at least one facet map, to the user terminal.

7. A non-transitory computer-readable having stored thereon, computer-executable instructions, which when executed by a computer, cause computer to execute operations, the operations comprising:

generating a facet selection environment based on at least one facet map, wherein the at least one facet map indicates a relationship among a plurality of facet elements, and wherein each of the plurality of facet elements indicates an attribute of content;

transmitting the generated facet selection environment to a user terminal corresponding to at least one user, wherein the user terminal displays a facet selection screen corresponding to the generated facet selection environment, and wherein at least one keyword is added to a list of the plurality of the facet elements that is displayed on the facet selection screen, based on a first user input;

receiving, operation information corresponding to a second user input on the facet selection screen and the at least one keyword, from the user terminal;

calculating a usage frequency of the added at least one keyword in the user terminal, based on the received operation information;

updating the at least one facet map to include the at least one keyword as a new element corresponding to the content, based on the calculated usage frequency that satisfies a first condition; and transmitting, the facet selection environment corresponding to the updated at least one facet map, to the user terminal.

* * * * *